United States Patent [19]

Shimizu et al.

[11] Patent Number: 5,663,602
[45] Date of Patent: Sep. 2, 1997

[54] SPINDLE MOTOR

[75] Inventors: Hideo Shimizu, Takeno-gun; Jun Inoue, Naka-gun, both of Japan

[73] Assignee: Nidec Corporation, Kyoto, Japan

[21] Appl. No.: 404,199

[22] Filed: Mar. 13, 1995

Related U.S. Application Data

[62] Division of Ser. No. 89,039, Jul. 9, 1993, Pat. No. 5,459,361.

[30] Foreign Application Priority Data

Jul. 14, 1992 [JP] Japan ................... 4-209608
Aug. 31, 1992 [JP] Japan ................... 4-257267

[51] Int. Cl.$^6$ ................... H02K 7/14; H02K 7/08
[52] U.S. Cl. ................... 310/67 R; 310/90
[58] Field of Search ................... 310/67 R, 90, 310/156, 42; 360/98.07, 99.04, 99.08

[56] References Cited

U.S. PATENT DOCUMENTS 4,779,165  10/1988  Elsaesser et al. ................... 310/156
4,843,500  6/1989  Elsaesser et al. ................... 310/156

Primary Examiner—Clayton E. LaBalle
Attorney, Agent, or Firm—McCormick, Paulding & Huber

[57] ABSTRACT

The inner wall of a hub has a step surface between an upper bearing mounting surface and a magnet mounting surface. A spacer of ring-like shape is directly mounted to the step surface of the hub for determining the upper position of a rotor magnet. The inside diameter of the spacer is smaller than the inner wall at the bearing mounting surface of the hub so that a space is created between the bearing mounting surface, the spacer, and the bearing for holding a portion of adhesive. When a portion of the adhesive applied for bonding the bearing to the bearing mounting surface of the hub remains uncured, it will be retained in the space and prevented from entering the interior of the motor.

7 Claims, 5 Drawing Sheets

SPINDLE MOTOR

This is a divisional of application Ser. No. 08/089,039 filed on Jul. 9, 1993, now U.S. Pat. No. 5,459,361.

FIELD OF THE INVENTION

The present invention relates to a spindle motor for rotation of a disk(s), e.g. a magnetic or optical disk.

DESCRIPTION OF THE PRIOR ART

Generally, a spindle motor comprises a bracket coupled to a disk drive apparatus and a hub rotor arranged rotatable in the bracket to act as rotor and carry a disk(s).

More particularly, a conventional spindle motor disclosed in U.S. Pat. No. 5,040,085 comprises a vertically extending shaft fixedly mounted to a bracket, a hub rotatably mounted by a pair of upper and lower bearings to the outer surface of the shaft, a stator mounted to the shaft between the two bearings, and a rotor magnet mounted to the inner wall of the hub to face the stator.

The hub is formed of an inverted-cup shape and its inside diameter is smaller in the upper than in the lower to form a bearing mounting surface to which the upper bearing is directly mounted. The lower bearing is mounted by a bushing to the lower of the inner wall of the hub.

In the conventional spindle motor, the upper bearing is bonded to a bearing mounting surface of the inner wall of the hub using an amount of adhesive. However, a portion of the adhesive tends to stay uncured after curing action and will flow down along the bearing mounting surface of the hub onto the stator or rotor magnet which may thus produce noises and malfunctions.

For solving the problem, the bearing mounting surface of the hub has an annular projection so that the inside diameter of the hub is smaller at the annular projection than at the bearing mounting surface, as depicted in U.S. Pat. No. 5,901,110. In action, the annular projection of the hub determines the lower position of the upper bearing and serves as a stopper to prevent the flow of an uncured portion of the adhesive.

It is however not easy and costly to fabricate the bearing mounting surface and the annular projection of the inner wall of the hub simultaneously in one process.

Also, the conventional spindle motor includes a bushing for coupling the lower bearing to a lower bearing mounting surface of the inner wall of the hub. The bushing is closely fitted into the hub causing a thrust against the hub. If the material of the bushing is different from that of the hub, a difference in thermal expansion between the two materials will produce an unwanted stress causing the hub to deflect outwardly and radially.

As the result, the magnetic disk(s) carried on the hub will be distorted and may collide against a head. For elimination of the unwanted stress, it is required to determine and implement the dimensions of the hub and the bushing of the conventional spindle motor at high accuracy for assembling closely to a size without dimensional error. This however increases the production cost.

SUMMARY OF THE INVENTION

It is a first object of the present invention to provide a spindle motor in which the hub is fabricated with ease and the flow of an uncured portion of adhesive applied for bonding bearings to the hub is prevented.

It is a second object of the present invention to provide a spindle motor in which the fitting of a bushing into the hub produces no deflection and is carried out without requiring high accuracy of the dimensions.

Other objects and advantages of the present invention will be apparent from the following description.

DETAILED DESCRIPTION OF THE PREFERRED EMBODIMENTS

Preferred embodiments of the present invention will be described in detail referring to the accompanying drawings.

A spindle motor according to a first embodiment of the present invention will be explained in conjunction with FIG. 1.

Figure 1:
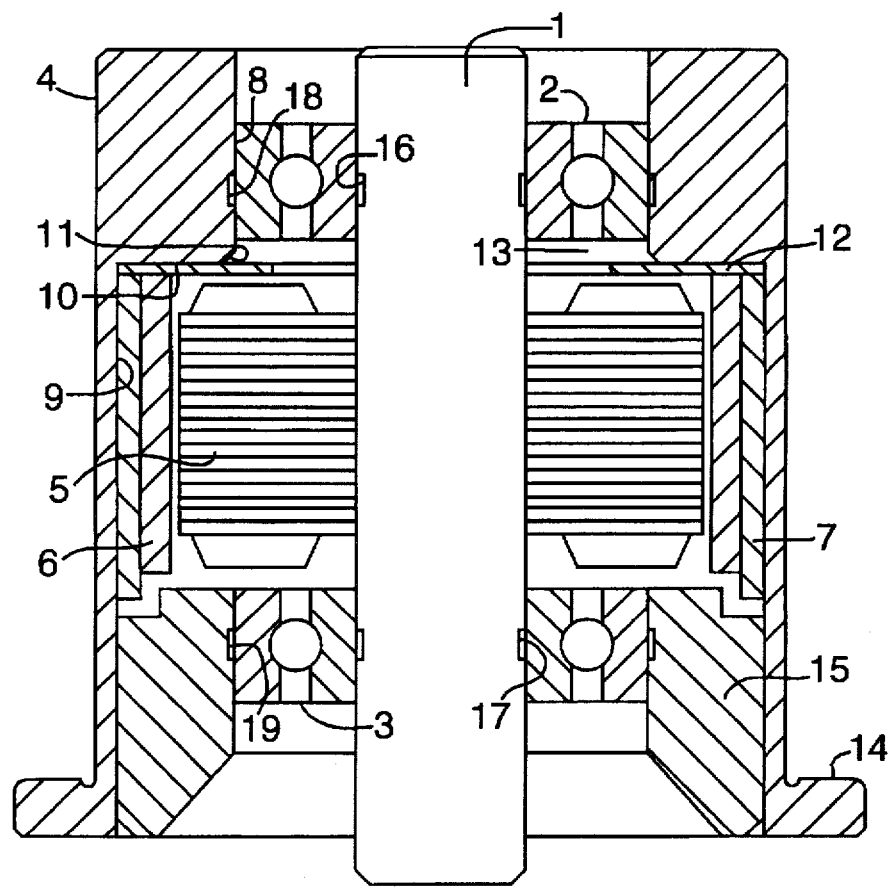
FIG. 1 is a cross sectional view of a spindle motor showing a first embodiment of the present invention.

The spindle motor of FIG. 1 is provided for use in a magnetic disk drive apparatus, in which a hub 4 of inverted cup shape for carrying a recording disk(s) is rotatably mounted by a pair of upper 2 and lower bearings 3 to a vertically extending stationary shaft 1. Also, a stator 5 is fixedly mounted to a side surface of the shaft 1 between the upper 2 and lower bearings 3. A rotor magnet 6 is mounted by a yoke 7 to the inner wall of the hub 4 so as to face the stator 5.

The hub 4 has an annular step surface 10 provided on the inner wall thereof and defined between a bearing mounting surface 8 in the upper and a magnet mounting surface 9 in the lower of the same. The inside diameter of the hub 4 is smaller at the upper bearing mount surface 8 than at the magnet mounting surface 9. The corner edge between the bearing mounting surface 8 and the annular step surface 10 is beveled by C-surface processing to form an annular slope 11.

The rotor magnet 6 and the yoke 7 are spaced from the annular step surface 10 of the hub 4 by the thickness of a spacer 12. The spacer 12 for determining the vertical position is formed of a flat ring-like shape of which outside diameter is substantially equal to the inside diameter at the magnetic mounting surface 9 of the hub 4. The inside diameter of the ring-like spacer 12 is smaller than that of the hub 4 at the bearing mounting surface 8 so that the inner edge of the spacer 12 extends inwardly from the bearing mounting surface 8. The upper bearing 2 fitted to the bearing mounting surface 8 is directly seated on the upper surface of the spacer 12 for determining its vertical position. There is created an annular space 13 between the outer side of the upper bearing 2, the corner slope 11 of the hub 4, and the upper surface of the spacer 12 for holding an excess of adhesive.

The hub 4 has a flange 14 provided on the lowermost of the outer wall thereof. The hub 4 is formed by machining an aluminum material or aluminum alloy into a shape in a common manner. A bushing 15 is fitted into the lower end of the hub 4 and the lower bearing 3 is fixedly mounted to the inner wall of the bushing 15.

In particular, the mounting of the two, upper and lower, bearings 2 and 3 between the shaft 1 and the hub 4 and between the shaft 1 and the bushing 15 respectively is by means of bonding with an ultra-violet curing type or anaerobic type adhesive.

For the purpose, an amount of the adhesive is first applied into adhesive grooves 16 and 17 provided in the outer surface of the shaft 1 and to their corresponding adhesive grooves 18 and 19 provided in the bearing mounting surface 8 of the hub 4 and the inner wall of the bushing 15. After the two bearings 2 and 3 are placed inbetween, the adhesive is cured by e.g. radiation of an ultra-violet beam.

If the adhesive applied into the adhesive groove 18 of the bearing mounting surface 8 fails to be cured completely after the curing action, its uncured portion flows down to the adhesive holding space 13 where it remains and will be prevented from entering the interior of the spindle motor.

A spindle motor of a second embodiment of the present invention will now be described referring to FIG. 2.

Figure 2:
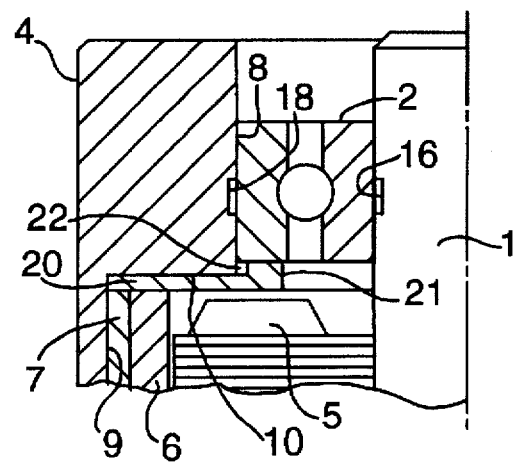
FIG. 2 is a cross sectional view of a primary part of another spindle motor showing a second embodiment of the present invention.

FIG. 2 illustrate a part of the spindle motor of the second embodiment. Similar to the first embodiment, a hub 4 coupled by an upper bearing 2 to a shaft 1 has a bearing mounting surface 8, a magnet mounting surface 9, and a step surface 10 defined between the bearing 8 and magnet mounting surfaces 9 which all are provided on the inner wall of the hub 4. A spacer 20 is sandwiched directly between the step surface 10 of the hub 4 and a combination of a rotor magnet 6 and a yoke 7.

The spacer 20 of ring-like shape has an outside diameter substantially equal to the inside diameter at the magnet mounting surface 9 of the hub 4 and an inside diameter smaller than the inside diameter at the bearing mounting surface 8 of the hub 4. In particular, the spacer 20 has an annular rib 21 provided on the inner edge of the upper surface thereof for directly sustaining the upper bearing 2. The outside diameter of the rib 21 is slightly smaller than the inside diameter at the bearing mounting surface 8 of the hub 4 so that an adhesive holding space 22 is produced between the bearing mounting surface 8 of the hub 4 and the spacer 20. More specifically, the adhesive space 22 is defined by the bearing mounting surface 8 of the hub 4, the upper surface of the spacer 20, the outer side of the rib 21, and the lower surface of the bearing 2.

Accordingly, if adhesive applied to the bearing mounting surface 8 of the hub 4 fails to be cured completely, its uncured portion flows down to the adhesive space 22 where it is retained and will not leak. Also, the upper bearing 2 is seated on the rib 21 of the spacer 20 determining its vertical position.

A spindle motor of a third embodiment of the present invention will be described referring to FIGS. 3 to 5.

Figure 3:
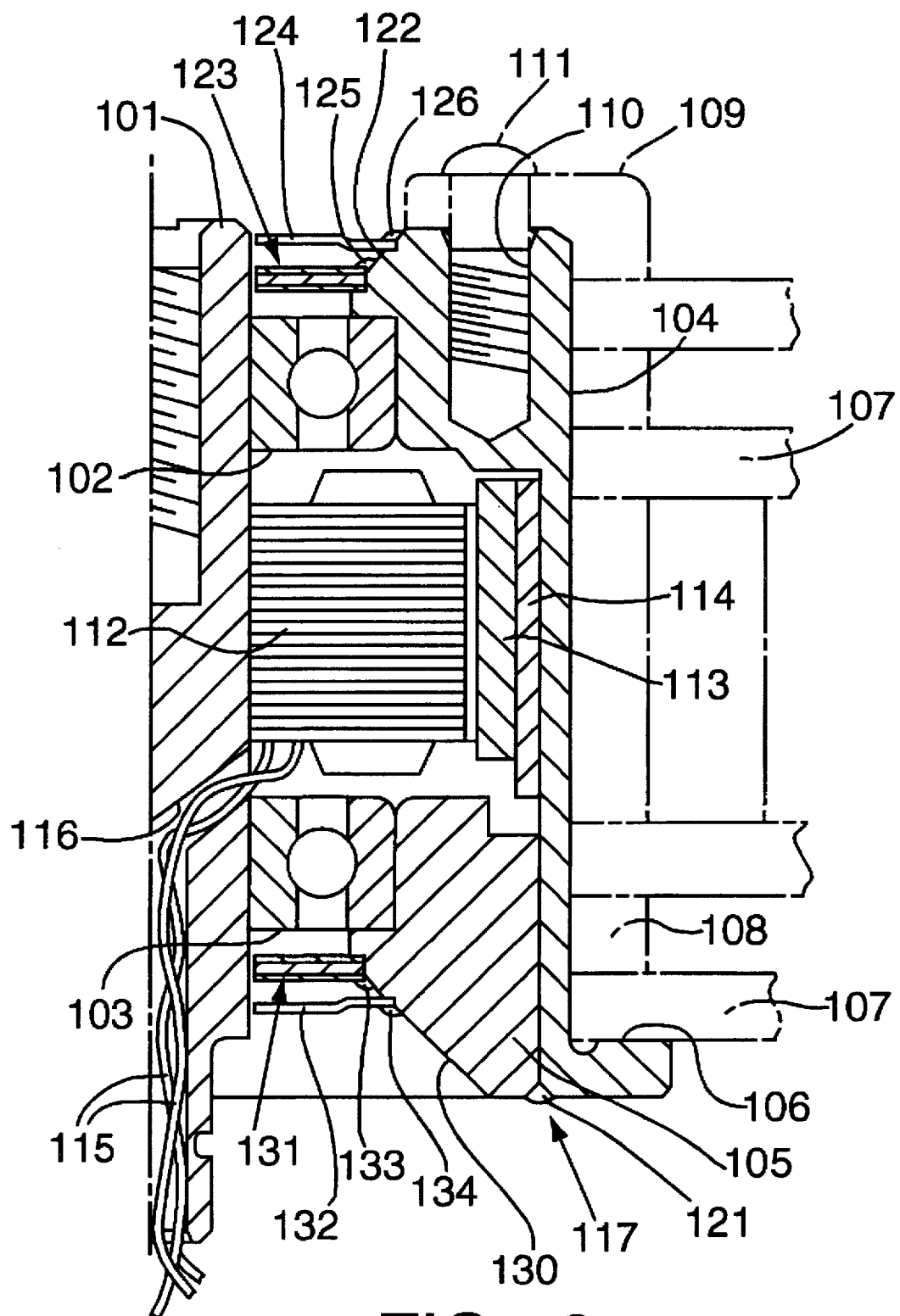
FIG. 3 is a cross sectional view of a further spindle motor showing a third embodiment of the present invention.

FIG. 3 shows a right half of the spindle motor installed in e.g. a magnetic disk drive apparatus. A shaft 101 of the spindle motor is made of a magnetic material, e.g. steel, and fixedly mounted to a base assembly of the magnetic disk drive apparatus. More particularly, the lower end of the shaft 101 is inserted into a lower portion of the base assembly while the upper end is tightened by a bolt to an upper portion of the base assembly. A pair of bearings 102 and 103 are mounted to both ends of the shaft 101. A hub 104 is rotatably mounted by the two bearings 102 and 103 to the shaft 101.

The hub 104 is formed of e.g. an aluminum material and has a shape to allow an upper part of its inner wall to engage directly with the outer race of the upper bearing 102 and a lower part of the same with a bushing 105 which is mounted directly to the outer race of the lower bearing 103. The hub 104 has a flange 106 provided on the lowermost of the outer wall thereof for supporting a plurality of disks 107. The disks 107 are alternated with spacers 108 in a pile and clamped with a clamp 109 from upper for securing to the hub 104. The clamp 109 is tightened to the hub 104 with screws 111 screwing into thread holes 110 of the hub 104.

Also, a stator 112 is fixedly mounted to the outer surface of the shaft 101 between the upper 102 and lower bearings 103. An annular rotor magnet 113 is fixedly mounted by a yoke 114 to the inner wall of the hub 104 so that it comes opposite to the stator 112 on the shaft 101. Lead lines 115 from the stator 112 extend through a bore 116 provided in the shaft 101 to the outside of the spindle motor.

Figure 4:
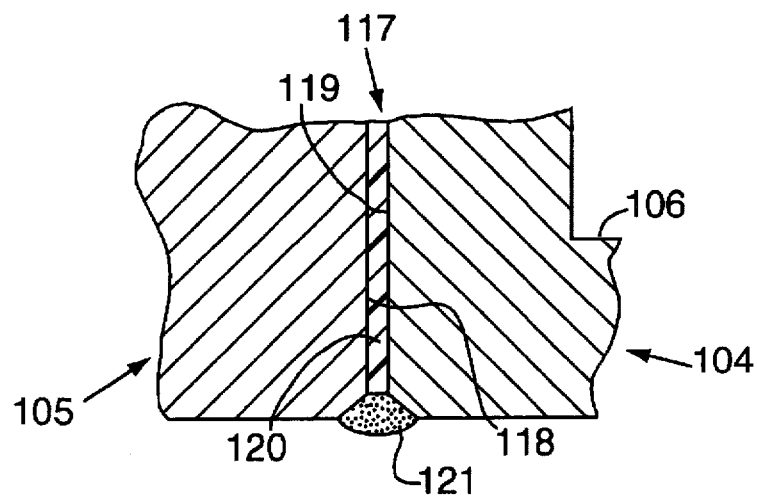
FIG. 4 is a cross sectional view showing the fitting of a bushing into a hub of the spindle motor of FIG. 3.

FIG. 4 is an enlarged view showing a joint 117 between the hub 104 and the bushing 105. The outer wall of the bushing 105 is sized to fit less tightly to the inner wall of the hub 104. If the bushing 105 is tightly fitted into the hub 104, excessive thrust or thermal expansion due to the tight fitting causes the hub 104 to deflect radially and outwardly. This deflection will be transmitted to the disks 107 causing errors in write and read operations. An amount of the adhesive 120 of e.g. an anaerobic type is applied to the joint 117 for bonding the bushing 105 to the hub 104. The adhesive 120 is sealed with a sealer agent 121 applied to the axially outward end of the joint 117 (exposing to the outside of the spindle motor or at the lower side in FIG. 4). The sealer 121 may be of an ultraviolet radiation curing type which is cured by radiation of an ultraviolet beam. The adhesive 120 in the joint 117 is air-tightened by the sealer 121 (not to expose to the open air) for encouraging the curing action and prevented from leaking out. Accordingly, escape from the spindle motor (and entering into the magnetic disk chamber of the disk drive apparatus) of particles of the adhesive in a gaseous state and of solvent gas resulting from incomplete curing of the adhesive will be avoided.

As the hub 104 and the bushing 105 are fitted loosely and bonded with the sufficient amount of the adhesive 120, they rarely need to be dimensioned and assembled with very high accuracy and a relevant thrust will hardly be transmitted to the outer wall of the hub 104. In addition, the curing of the adhesive 120 is guaranteed thus increasing the bonding strength and providing a higher operational reliability. The lower corner edges of the inner wall of the hub 104 and of the outer wall of the bushing 105 are beveled at 45 degrees to the axial direction for ease of application of the sealer 121. As the result, peeling of the sealer 121 caused by e.g. deflection will be minimized.

The hub 104 has at upper end a taper surface 122 thereof extending above the upper bearing 102 so that the axially extending upper opening of the hub 104 becomes greater towards the uppermost. An annular magnetic fluid sealing member 123 and an annular protector cap 124 situated above (or outwardly of) the sealing member 123 are bonded to the taper surface 122 of the hub 104 with adhesives 125 and 126 respectively. The magnetic fluid sealing member 123 comprises a magnet 127 of ring-like shape and two annular pole pieces 128 and 129 of a magnetic material coupled to both sides of the ring-like magnet 127. A magnetic fluid is filled between the shaft 101 and the magnetic fluid sealing member 123 thus preventing the escape of unclean air from the upper bearing 102 towards the outside of the motor.

The taper surface 122 is sloped at about 45 degrees to the axial direction in order to minimize peeling of the adhesives 125 and 126 caused by thermal expansion or contraction of the hub 104. More specifically, if a stress is given on the hub 104 by thermal contraction in the leftward direction in FIG. 5, it separates mainly into two segment forces F1 and F2. The force F1 acts at a right angle to the taper surface 122 while the force F2 is thrust horizontally. Hence, the bonding strength of the adhesive 125 will be preserved as the stress caused by thermal deflection is dispersed, thus preventing the adhesive 125 from peeling off.

A similar arrangement is made on the bushing 105 where its taper surface 130 extends beneath the lower bearing 103 so that the lower opening of the bushing 105 becomes greater towards the lowermost. An annular magnetic fluid sealing member 131 and an annular protector cap 132 situated below (or outwardly of) the sealing member 131 are bonded to the taper surface 130 of the bushing 105 with adhesives 133 and 134 respectively. The magnetic fluid sealing member 131 comprises a magnetic of ring-like shape and two annular pole pieces coupled to both sides of the ring-like magnet. A magnetic fluid is filled between the shaft 101 and the magnetic fluid sealing member 131 for sealing the bottom of the spindle motor.

Figure 5:
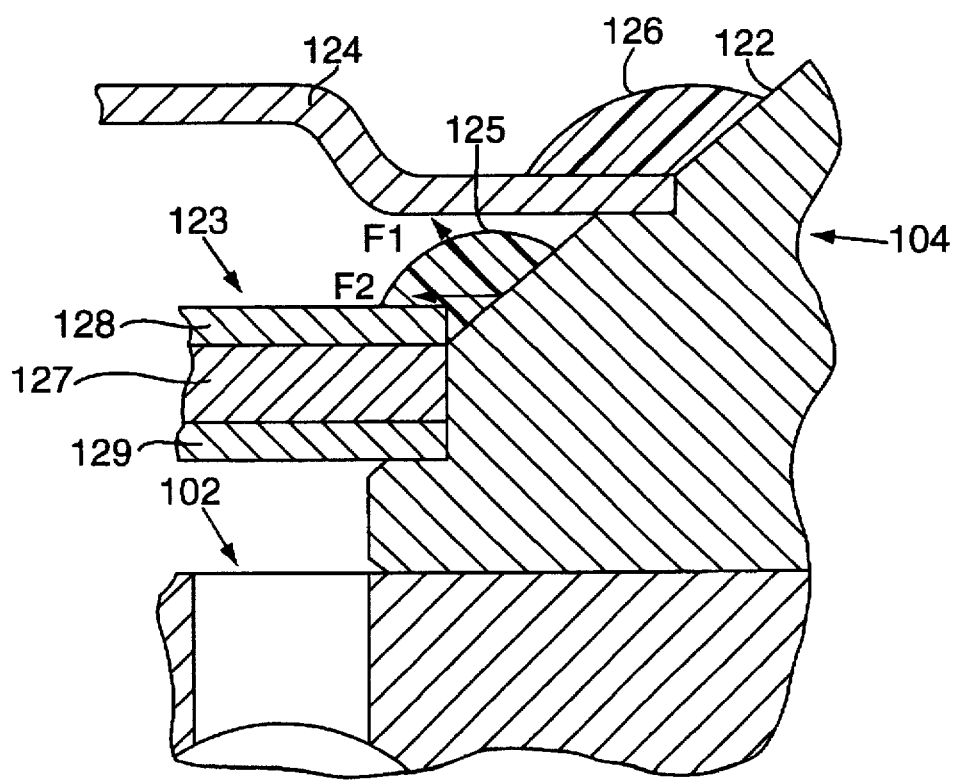
FIG. 5 is a cross sectional view showing the attachment of a magnetic fluid sealing member in the spindle motor of FIG. 3.

FIGS. 6 to 9 illustrate modifications of the spindle motors of the embodiments shown in FIGS. 3 to 5. As the modified spindle motors are substantially identical in the primary construction to those of FIGS. 3 to 5, except the arrangement for sealing, the modified arrangements for sealing will then be explained in detail.

Figure 6:
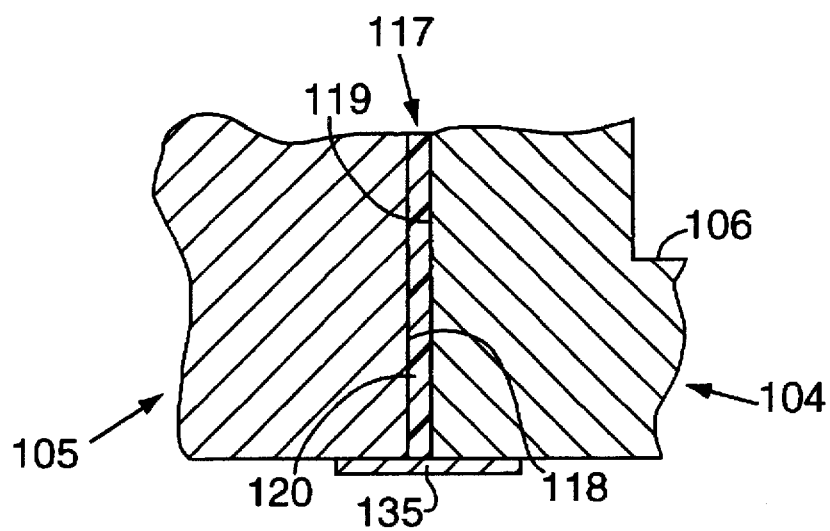
FIG. 6 is a cross sectional view showing a first modification of a sealer.

A first modification shown in FIG. 6 includes a sealer 135 for sealing the adhesive 120 applied to the joint 117 between the inner wall of the hub 104 and the outer wall of the bushing 105. The sealer 135 is attached across the joint 117 between the hub 104 and the bushing 105 so that it prevents the adhesive 120 from leaking from the joint 117. The adhesive 120 may be of a thermal curing type rather than the anaerobic type. Escape of the adhesive 120 will also be prevented by the sealer 135 with equal success and the bonding strength will be maintained.

Figure 7:
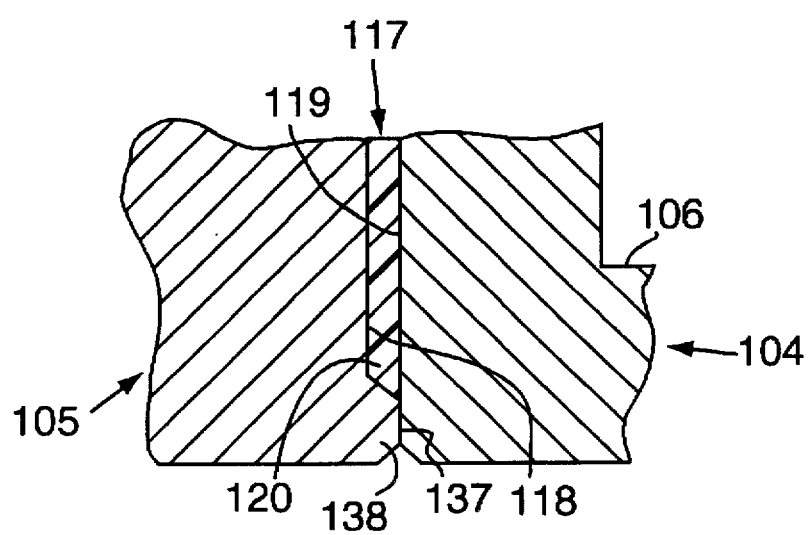
FIG. 7 is a cross sectional view showing a second modification of the sealer.

A second modification shown in FIG. 7 includes an annular rib 136 provided integrally on the lower end of the outer wall 118 of the bushing 105 for serving as a sealing member to hold the adhesive 120 applied to the joint 117. The annular rib 136 of the bushing 105 is formed of a substantially trapezoid shape in cross section so that the upper edge 137 of its trapezoid shape comes in direct contact with the inner wall 119 of the hub 104. The contact edge 137 of the annular rib 136 is thrust against the inner wall 119 of the hub 104 thus sealing the joint 117 where the adhesive 120 is filled.

The thrusting of the contact edge 137 of the rib 137 against the inner wall 119 of the hub 104 acts as a part of the bonding action of the joint 117. Hence, the hub 104 and the bushing 105 will substantially be coupled to each other by the elastic bonding strength of the adhesive 120 of the joint 117 causing the stress on the hub 104 to be minimized. The rib 136 of the bushing 105 will encourage the curing of the adhesive 120 thus ensuring the bonding strength. As the hub 104 is coupled to the bushing 105 by means of the elastic bonding strength, its outer surface remains free from unfavorable stresses and it will be assembled without the use of precision components or at no critical processing accuracy without imparting the bonding strength. The second modification permits the annular rib 136 of the bushing 105 to be varied in width in order to control a thrust of the rib 136 against the inner wall 119 of the hub 104.

Figure 8:
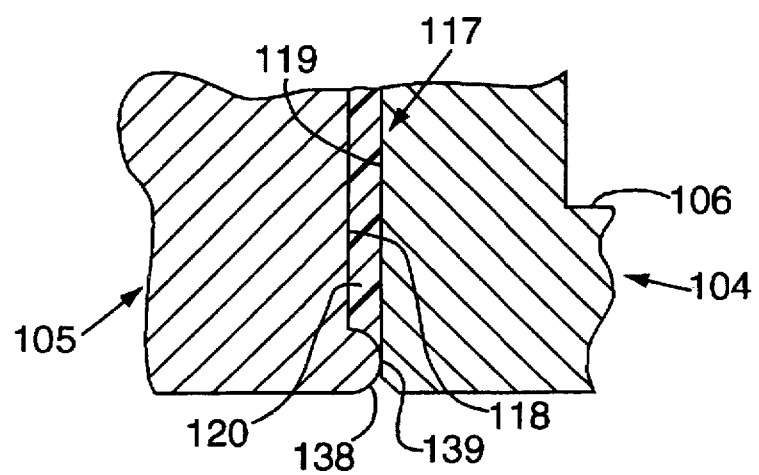
FIG. 8 is a cross sectional view showing a third modification of the sealer.

A third modification shown in FIG. 8 includes an annular rib 138 provided integrally on the lower end of the outer wall 118 of the bushing 105 for serving as a sealing member to hold the adhesive 120 in the joint 117. The annular rib 138 is formed of a semi-circular shape in cross section so that the top edge 139 of its semi-circular shape comes into direct contact with the inner wall 119 of the hub 104. The contact edge 139 extends to provide a linear contact, thus allowing the bushing 105 of a relatively soft material to be fitted into the hub 104 with ease to provide the sealing effect.

Figure 9:
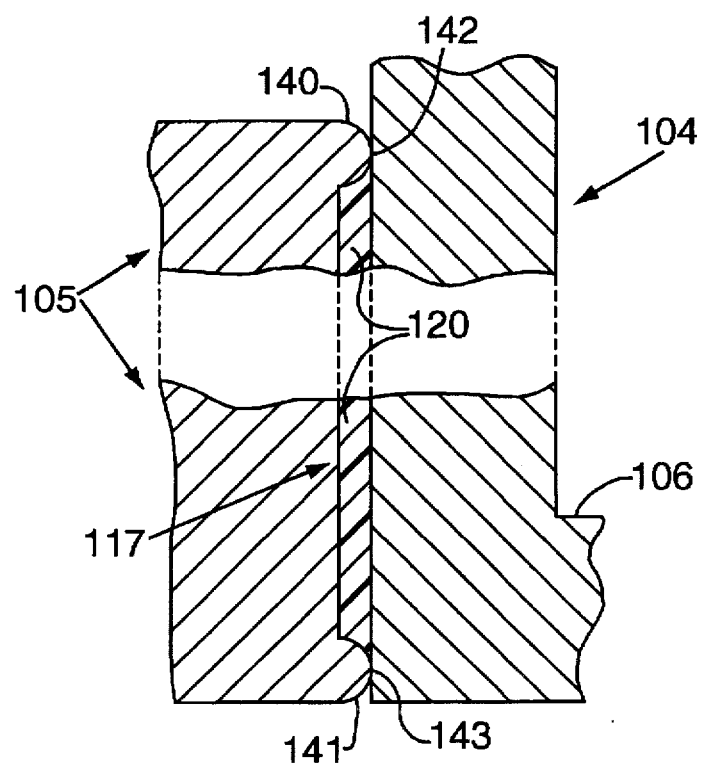
FIG. 9 is a cross sectional view showing a fourth modification of the sealer.

A fourth modification shown in FIG. 9 includes two annular ribs 140 and 141 provided integrally on the upper and lower ends of the outer wall 118 of the bushing 105 respectively for serving as sealing members to contain the adhesive 120 in the joint 117. Each of the annular ribs 140 and 141 is formed of a semi-circular shape in cross section and disposed to come in direct contact with the inner wall 119 of the hub 104. The two annular ribs 140 and 141 of the bushing 105 contain the adhesive 120 therebetween to seal off the interior of the spindle motor while their contact edges 142 and 143 are thrust against the inner wall 119 of the hub 104. The two ribs 140 and 141 of the semi-circular shape are thrust not to give an excessive stress on the hub 104 and thus, allow the bushing 105 to be fitted into the hub 104 without the use of precision components or at no critical accuracy. They hold the adhesive 120 inbetween and thus, the bonding strength will be ensured and the operational reliability will be increased.

It would be understood that the spindle motor of the present invention is not limited to the foregoing embodiments and other changes and modifications will be made without departing from the scope of the present invention.

We claim:

1. A spindle motor comprising:

a stationary shaft;

a stator fixedly mounted on said shaft;

a pair of bearings mounted on said shaft respectively at upper and lower sides of said stator;

a hub rotatably mounted on said shaft by said pair of bearings;

a rotor magnet fixedly mounted on the inner wall of said hub to face said stator;

a bushing adhesively bonded to an inner wall of said hub, said hub being directly attached to one of the pair of bearings and to the other of the pair of bearings via the bushing, said hub and said bushing having confronting surfaces terminating at open ends substantially at the same position in the direction of axis of the motor, said confronting surfaces of said hub and said bushing being concentric with said shaft; and a sealing member disposed on the axially outer end of the confronting surfaces of said hub and said bushing, said sealing member including an annular rib disposed integrally on the axially outer end of said confronting surface of said bushing so that said annular rib of said bushing comes into contact with said confronting surface of said hub to thereby prevent said bonding adhesive from leaking out.

2. A spindle motor according to claim 1, wherein the annular rib of said bushing is formed of a trapezoid shape in cross section.

3. A spindle motor according to claim 1, wherein the annular rib of said bushing is formed of a semi-circular shape in cross section.

4. A spindle motor comprising:

a stationary shaft;

a stator fixedly mounted on said shaft;

a pair of bearings mounted on said shaft respectively at upper and lower sides of said stator;

a hub rotatably mounted on said shaft by said pair of bearings;

a rotor magnet fixedly mounted on an inner wall of said hub to face said stator;

a bushing being directly bonded to the inner wall of said hub by adhesive, said hub being directly attached to one of the pair of bearings and to the other of the pair of bearings via said bushing; and an adhesive tape being stuck on the open lower bonding surface of said hub and said bushing to prevent said bonding adhesive from leaking out.

5. A spindle motor comprising:

a stationary shaft;

a stator fixedly mounted on said shaft;

a pair of bearing mounted on said shaft respectively at upper and lower sides of said stator;

a hub rotatably mounted on said shaft by said pair of bearings;

a bushing directly adhesively bonded to an inner wall of said hub;

a rotor magnet fixedly mounted on the inner wall of said hub to face said stator, said hub being attached directly to one of the pair of bearings and to the other of the pair of bearings via said bushing, an upper surface of said hub and a lower surface of said bushing being beveled to have a taper surface;

a pair of magnetic fluid sealing members adhesively bonded to said taper surface at an axially outward end of one of said pair of bearings between said shaft and said hub, and to an axially outward end of the other of said bearings between said shaft and said bushing.

6. A spindle motor according to claim 5, wherein the taper surfaces of said hub and said bushing are at an angle of about 45 degrees to the axial direction.

7. A spindle motor comprising:

a stationary shaft;

a stator fixedly mounted on said shaft;

a pair of bearings mounted on said shaft respectively at upper and lower sides of said stator;

a hub rotatably mounted on said shaft by said pair of bearings;

a rotor magnet fixedly mounted on the inner wall of said hub to face said stator;

a bushing adhesively bonded to an inner wall of said hub, said hub being directly attached to one of the pair of bearings and to the other of the pair of bearings via the bushing, said hub and said bushing having confronting surfaces terminating at open ends substantially at the same position in the direction of axis of the motor, said confronting surfaces of said hub and said bushing being concentric with said shaft; and a sealing member disposed on the axially outer end of the confronting surfaces of said hub and said bushing for preventing said adhesive from leaking out, said sealing member including sealing adhesive of more quickly-drying type than bonding adhesive, the bottom surface of said confronting surface of said hub and said bushing are beveled to form an annular groove, and the annular groove is filled with said sealing adhesive.

* * * * *